US006625287B1

(12) United States Patent
Wurtz

(10) Patent No.: US 6,625,287 B1
(45) Date of Patent: Sep. 23, 2003

(54) ENHANCING AUTOMATIC NOISE REDUCTION USING NEGATIVE OUTPUT RESISTANCE

(76) Inventor: Michael Wurtz, 1156 Laurel Ave., St. Paul, MN (US) 55104

( * ) Notice: Subject to any disclaimer, the term of this patent is extended or adjusted under 35 U.S.C. 154(b) by 0 days.

(21) Appl. No.: 09/261,476

(22) Filed: Feb. 26, 1999

Related U.S. Application Data

(60) Provisional application No. 60/076,154, filed on Feb. 26, 1998.

(51) Int. Cl.[7] ............................ H04B 15/00; H04R 3/00

(52) U.S. Cl. .......................... 381/94.1; 381/96; 381/98; 381/74; 381/71.1; 381/71.6; 381/71.13; 327/110; 330/256

(58) Field of Search ............................. 381/55, 96, 72, 381/74, 94.1

(56) References Cited

U.S. PATENT DOCUMENTS 4,118,600 A * 10/1978 Stahl ........................... 381/98
4,455,675 A * 6/1984 Bose et al. ................... 381/74
4,944,020 A * 7/1990 Noro ........................... 381/96
4,980,920 A * 12/1990 Noro et al. ................... 381/96
5,036,228 A * 7/1991 Noro .......................... 327/108

* cited by examiner

*Primary Examiner*—Kimberly A. Williams
*Assistant Examiner*—Andrew Graham
(74) *Attorney, Agent, or Firm*—Schwegman, Lundberg, Woessner & Kluth, P.A.

(57) ABSTRACT

An Automatic Noise Reduction system wherein the Q of the frequency response is reduced using a negative output resistance to substantially eliminate the coil resistance of a speaker in a headset. The resulting system is less sensitive to variations in operating parameters, such as headset fit on a user and component variations. Temperature compensation of a negative output resistance amplifier is introduced to maintain stability over a wide range of operating temperatures. Temperature compensation includes substantially matching the temperature coefficient of the negative output resistance amplifier to the temperature coefficient of the speaker coil.

11 Claims, 7 Drawing Sheets

ENHANCING AUTOMATIC NOISE REDUCTION USING NEGATIVE OUTPUT RESISTANCE

CROSS-REFERENCE TO RELATED APPLICATION

This application is a continuation of U.S. provisional application 60/076,154, filed Feb. 26, 1998, and incorporated herein by reference.

TECHNICAL FIELD

The invention relates generally to noise reduction systems. In particular, the invention relates to negative output resistance amplifiers in noise reduction systems, and more particularly to temperature-compensated negative output resistance amplifiers in noise reduction systems.

BACKGROUND

Automatic Noise Reduction (ANR) systems cancel or reduce unwanted acoustic waves by generating an out-of-phase response, thereby canceling out the unwanted waves. FIG. 1 depicts an ANR system 100 having a microphone 110, a filter 120 and a speaker 130.

In referring to FIG. 1, the combination of the microphone 110, filter 120 and speaker 130 form a transfer function G(f)=Output(f)/Input(f). This creates a closed-loop control system that reduces ambient noise around the microphone according to the function 1/(1−G(f)).

ANR can be used in a variety of applications. For example, an ANR system may be placed near the muffler of a motor vehicle to reduce vehicle noise emissions. Also, an ANR system can be incorporated in a headset. Such an ANR headset can be worn by construction workers to protect their hearing. Similarly, the ANR headset can be worn by airplane pilots whose ability to hear may suffer from engine noise.

FIG. 2 illustrates one embodiment of an ANR headset 200 worn by a user 201. The ANR headset 200 includes two cups 240, each of which fits over an ear 202 of the user 201. Each cup 240 is enclosed by a cup wall 235. The cup 240 is sealed about the ear 202 by a cushion 205 to diminish undesired noise from reaching the user's ear 202, and to provide the user 201 with a comfortable fit.

The cup 240 also includes a speaker 220. The speaker 220 broadcasts the out-of-phase audio signal. The speaker 220 also defines front and rear cavities, 245 and 250 respectively, in the cup 240.

A microphone 210 is inserted in the front cavity 245 proximate to the user's ear 202. The microphone 210 receives the audible noise. The microphone 210 is coupled through a filter 225 to the speaker 220. Optionally, for ANR headsets 200 worn by users that must receive audio communication signals, a signal summer 215 is inserted between the microphone 210 and filter 225. The signal summer 215 is connected to an audio output 230 that permits the user 201 to listen to desired audio signals while reducing undesired ambient noise. For example, this technique permits an airplane pilot to listen to radio communications even when ambient noise is being suppressed by the ANR system. The filter 225 and summer 215 can be incorporated in the ANR headset 200, such as in the cups 240, or they may be positioned externally with respect to the cups 240.

The electroacoustic combination of each cup's speaker, and front and rear cavities create relatively high Q resonances in the audio frequency response of the speaker. The resonances' amplitudes and frequencies can readily change as a result of variations in cup and speaker construction. Further, the resonances' amplitudes and frequencies can also readily change as a result of variations in cavity dimensions which may result from varying headset positions on different users, and varying shapes of users' heads and ears.

A speaker 220, and its resonances, can be modeled by a lumped equivalent circuit, as illustrated in FIG. 3. $R_E$ represents the resistance of the wire coil of the speaker. A represents the area of the speaker's diaphragm. $M_M$ represents the moving mass of the speaker. $R_M$ represents the speaker's mechanical damping associated with suspension of the wire coil. $C_M$ represents the speaker's compliance associated with suspension of the diaphragm. $Z_C$ is the acoustic impedance that terminates the speaker's diaphragm. Finally, $Z_{LOAD}$ is the input impedance seen across the speaker input terminals.

To permit relatively uniform ANR across the audible frequency range, the high Q response of the speaker is equalized, or diminished. To this end, an equalization filter is included in the filter 225 of the ANR system, described above. The equalization filter typically must cancel complex pole-zero pairs because of the cup's high Q frequency response. Because of the cup's high Q frequency response, the equalization is sensitive to, and can be diminished by, minor variations in operating parameters, such as headset fit on a user and component variations. To diminish the relatively high Q response of the cup, fabric is often placed over vents in the back of the speakers. The fabric dampens the frequency response of the speakers, thus reducing the Qs of the resonances. However, as a result, the fabric also undesirably diminishes the efficiency of the speakers, and provides variable changes in performance.

Further, such an equalization filter is relatively costly because of the number of required parts necessary to cancel the complex pole-zero pairs. One embodiment of an ANR filter 225 incorporating an equalization filter 410 and a noise reduction filter 420 is illustrated in FIG. 4.

The ANR filter 225 provides the correct open-loop response for G(f) so that the closed-loop response of the ANR headset 200 provides high gain (i.e., high noise cancelation) and closed-loop stability.

It has been proposed by Ståhl in U.S. Pat. No. 4,118,600, issued Oct. 3, 1978, that the bass response of a loudspeaker can be improved by including a negative impedance in series with a plurality of impedances connected in parallel, such that the negative impedance (including negative resistance) is chosen to be substantially equal to the impedance of the voice-coil of the loudspeaker. Ståhl proposed that the plurality of parallel impedances have values which cause the loudspeaker to exhibit apparent mechanical parameters which are substantially different from the actual mechanical parameters in the bass response of the loudspeaker.

For the reasons stated above, and for other reasons stated below which will become apparent to those skilled in the art upon reading and understanding the present specification, there is a need in the art for ANR systems capable of diminishing the Q of the frequency response of the speaker, without reducing speaker efficiency.

SUMMARY

The present invention provides a method of enhancing automatic noise reduction in a headset speaker using a negative output resistance to substantially eliminate the coil resistance of the speaker. In one embodiment, the method includes generating a negative output resistance substantially equal in magnitude to the coil resistance of the speaker, and serially combining the negative output resistance with the coil resistance of the speaker. In another embodiment, generating a negative output resistance includes generating a negative output resistance using a negative output resistance amplifier. In a further embodiment, generating a negative output resistance includes generating a negative output resistance using a single-ended negative output resistance amplifier. In yet another embodiment, generating a negative output resistance includes generating a negative output resistance using a balanced negative output resistance amplifier.

The invention further provides a method of temperature compensating a system having a negative output resistance amplifier and a resistive load. In one embodiment, the method includes coupling a negative output resistance amplifier to the resistive load, and temperature compensating the negative output resistance amplifier so that a temperature coefficient of the negative output resistance is approximately equivalent to a temperature coefficient of the resistive load. In another embodiment, temperature compensating the negative output resistance amplifier includes implementing a resistor in the negative output resistance amplifier having a temperature coefficient substantially equivalent to the temperature coefficient of the resistive load, wherein the output resistance of the negative output resistance amplifier is directly proportional to the resistance of the resistor and wherein remaining resistors have resistances which are substantially temperature invariant. In a further embodiment, temperature compensating the negative output resistance amplifier includes implementing a resistor in the negative output resistance amplifier having a temperature coefficient substantially equivalent to the inverse of the temperature coefficient of the resistive load, wherein the output resistance of the negative output resistance amplifier is inversely proportional to the resistance of the resistor and wherein remaining resistors have resistances which are substantially temperature invariant. In a still further embodiment, temperature compensating the negative output resistance amplifier includes implementing at least two resistors in the negative output resistance amplifier having temperature coefficients such that their combination results in a temperature coefficient of the negative output resistance amplifier which is substantially equivalent to the temperature coefficient of the resistive load.

Another embodiment of the invention provides a method of diminishing the Q of the frequency response of a headset speaker using a temperature-compensated negative output resistance to substantially eliminate the coil resistance of the speaker. In one embodiment, the method includes generating a negative output resistance substantially equal in magnitude to the coil resistance of the speaker, temperature compensating the negative output resistance to substantially match the temperature variation of the coil resistance of the speaker, and serially combining the negative output resistance with the coil resistance of the speaker.

A further embodiment of the invention provides an automatic noise reduction headset. The automatic noise reduction headset includes a pair of cups, wherein each cup includes a speaker having a wire coil. The headset further includes a negative output resistance amplifier, having a negative output resistance, operatively coupled to each speaker to enhance automatic noise reduction. The headset further includes a filter operatively coupled to each negative output resistance amplifier and a microphone, in each cup, operatively coupled to each filter. In one embodiment, each negative output resistance amplifier is temperature compensated so that a temperature coefficient of the negative output resistance is approximately equivalent to a temperature coefficient of a resistance of the wire coil.

A further embodiment of the invention provides an automatic noise reduction headset having a negative output resistance amplifier coupled in series with the coil resistance of a headset speaker. In a still further embodiment, the negative output resistance amplifier is temperature compensated to substantially match the temperature variation of the coil resistance of the headset speaker.

Further embodiments of the invention include automatic noise reduction headsets produced in accordance with one or more methods of the invention. Such headsets are capable of diminishing the Q of the frequency response of the headset speakers in the headset cups, without adversely affecting speaker efficiency.

DESCRIPTION OF THE EMBODIMENTS

In the following detailed description of the preferred embodiments, reference is made to the accompanying drawings which form a part hereof, and in which is shown by way of illustration specific embodiments in which the inventions may be practiced. These embodiments are described in sufficient detail to enable those skilled in the art to practice the invention, and it is to be understood that other embodiments may be utilized and that process or mechanical changes may be made without departing from the scope of the present invention. The following detailed description is, therefore, not to be taken in a limiting sense, and the scope of the present invention is defined only by the appended claims.

Reducing the Q of the Frequency Response in an ANR Headset

One embodiment of the invention provides a technique for diminishing the Q of the frequency response of the speakers in the cups, without reducing speaker efficiency. The Q of the frequency response is reduced by substantially eliminating the speaker coil resistance, $R_E$. Because of the lower Q of the cup's frequency response, the equalization is less sensitive to variations in operating parameters, such as headset fit on a user and component variations.

Figure 1:
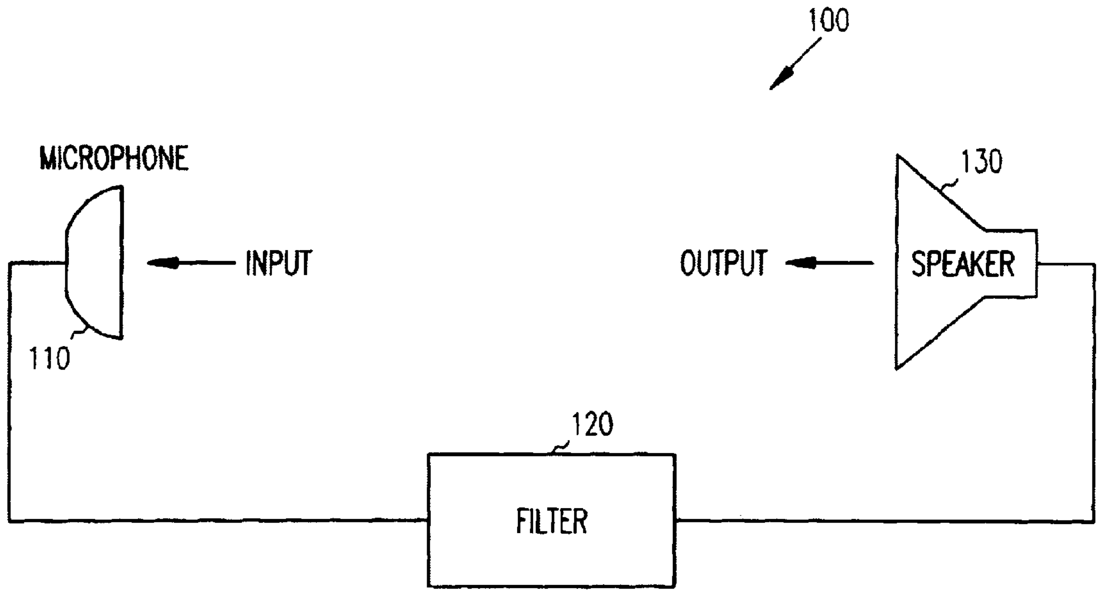
FIG. 1 (BACKGROUND ART)
FIG. 1 is a schematic of an automatic noise reduction system.
Figure 2:
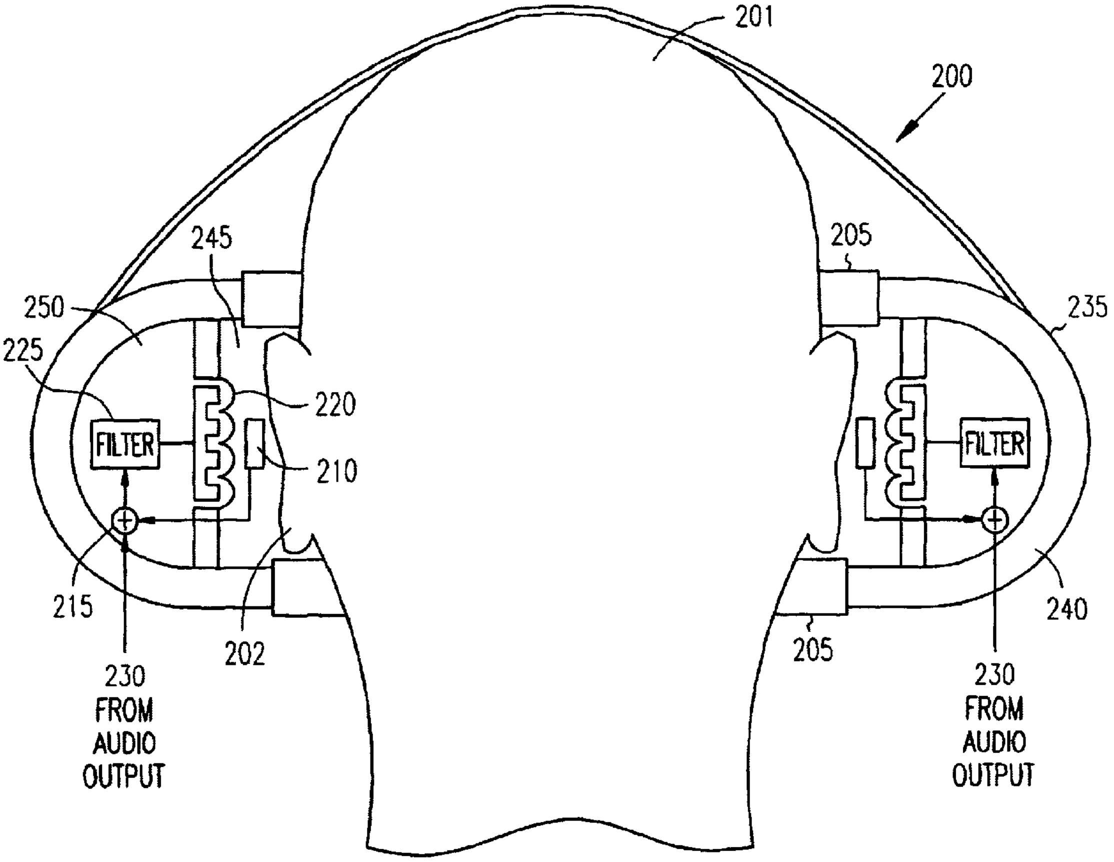
FIG. 2 (BACKGROUND ART)
FIG. 2 is a schematic of an automatic noise reduction headset.
Figure 3:
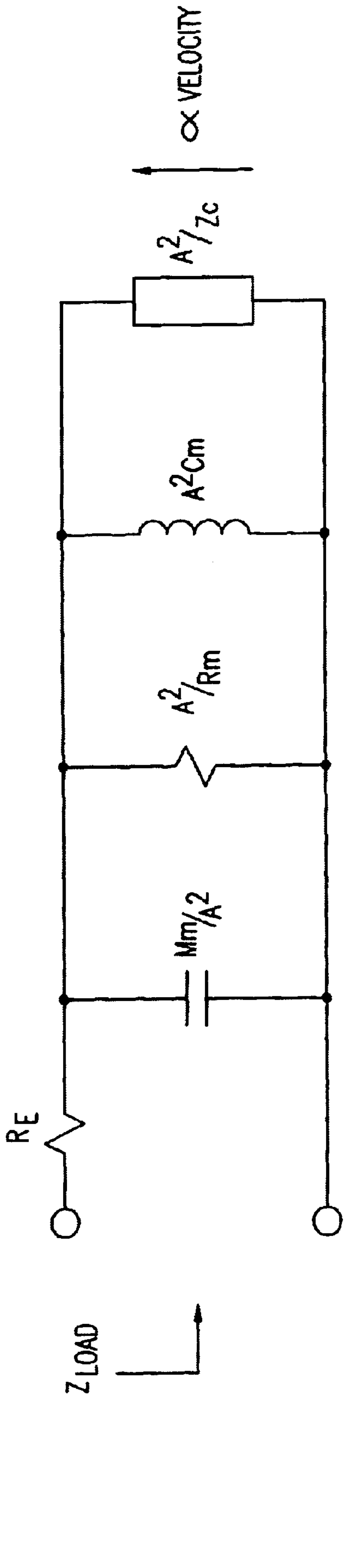
FIG. 3 (BACKGROUND ART)
FIG. 3 is a lumped equivalent circuit of a speaker and its resonances.
Figure 4:
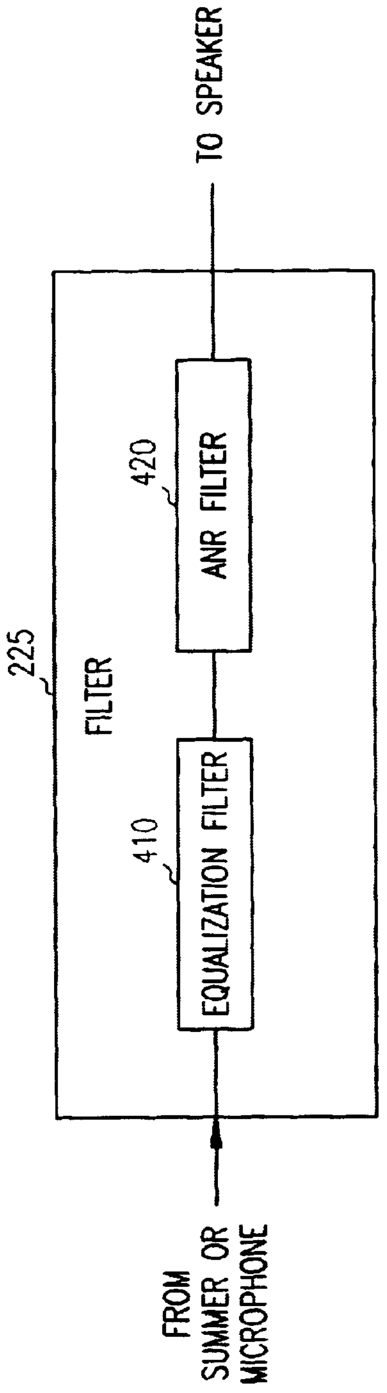
FIG. 4 (BACKGROUND ART)
FIG. 4 is a block diagram of an automatic noise reduction filter incorporating an equalization filter and a noise reduction filter.
Figure 5:
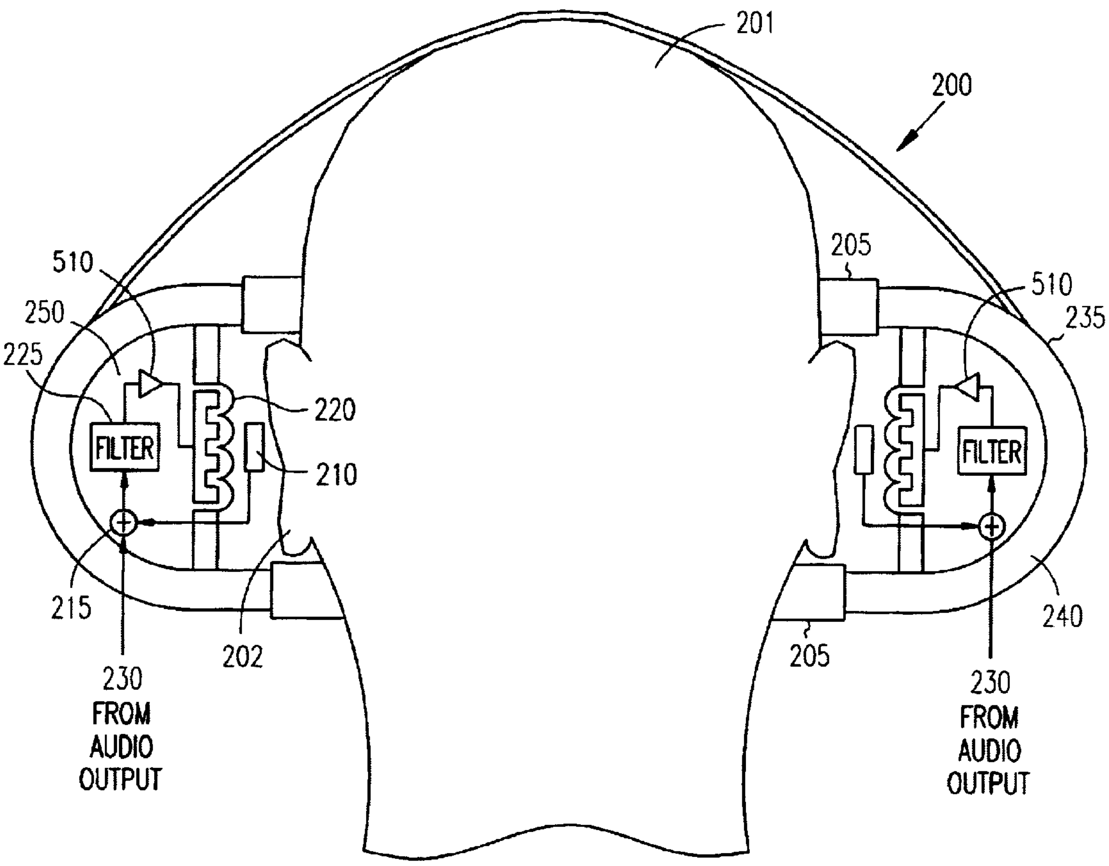
FIG. 5 is a schematic of an automatic noise reduction headset in accordance with an embodiment of the invention.

The speaker coil resistance is substantially eliminated by inserting a negative output resistance amplifier 510 between the filter 225 and speaker 220, as illustrated in FIG. 5. A negative output resistance amplifier, as its name suggests, has a negative output resistance.

Figure 6A:
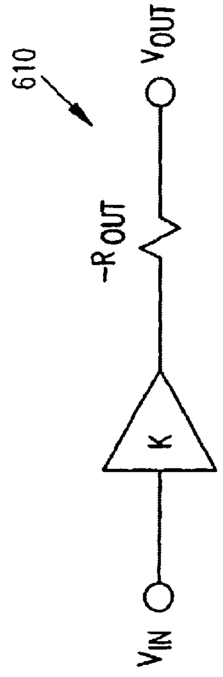
FIG. 6A is an equivalent circuit of a negative output resistance amplifier in accordance with an embodiment of the invention.

An equivalent circuit 610 of a negative output resistance amplifier 510 is illustrated in FIG. 6A. The negative output resistance amplifier 510 is designed so that the negative output resistance, $R_{OUT}$, is a significant portion of $R_E$, for example ninety percent of its magnitude. Also, k is the gain of the negative output resistance amplifier.

Figure 6B:
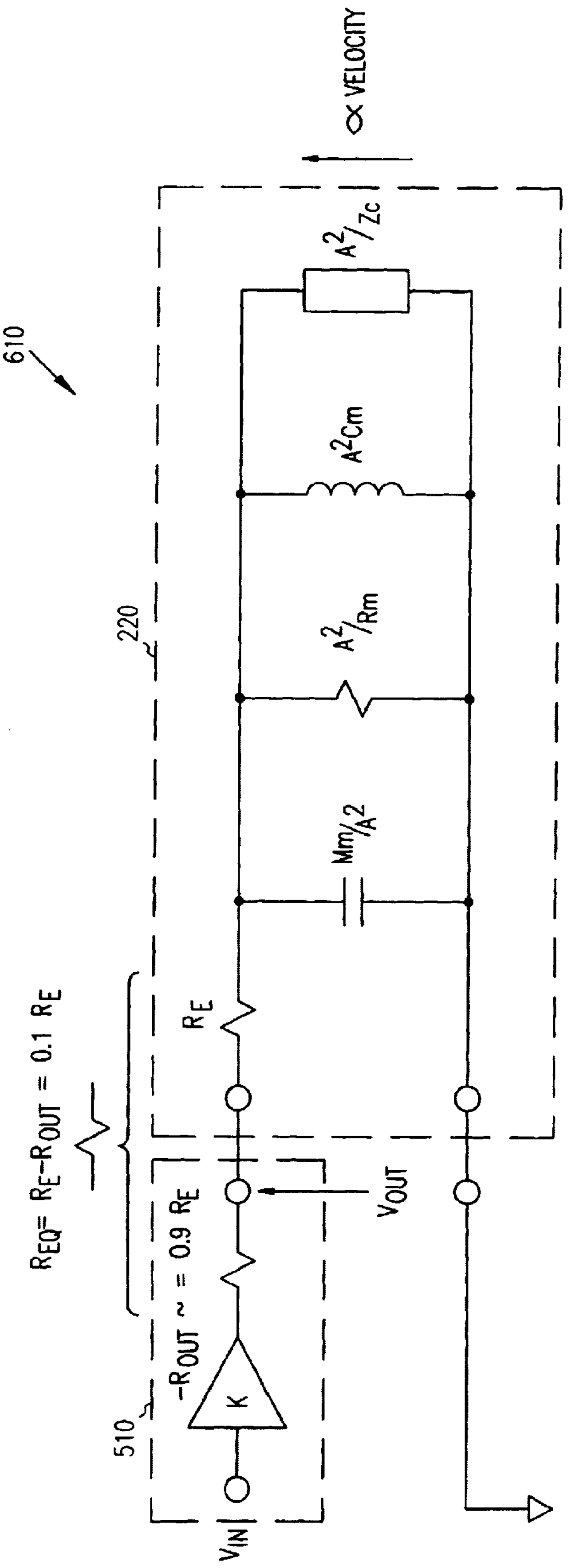
FIG. 6B is an equivalent circuit of a combination of a negative output resistance amplifier and a speaker in accordance with an embodiment of the invention.

FIG. 6B illustrates a schematic diagram of an equivalent circuit 620 of the combination of a negative output resistance amplifier 510 and a speaker 220. In another embodiment of the present invention, the negative output resistance amplifier 510 has an $R_{OUT}$ that is equal to about $0.9*R_E$ in magnitude. As a result, a small, but finite equivalent resistance, $R_{EQ}$, of about $0.1*\ R_E$, remains so that the negative output resistance amplifier 510 does not become unstable, and oscillate.

Figure 7A:
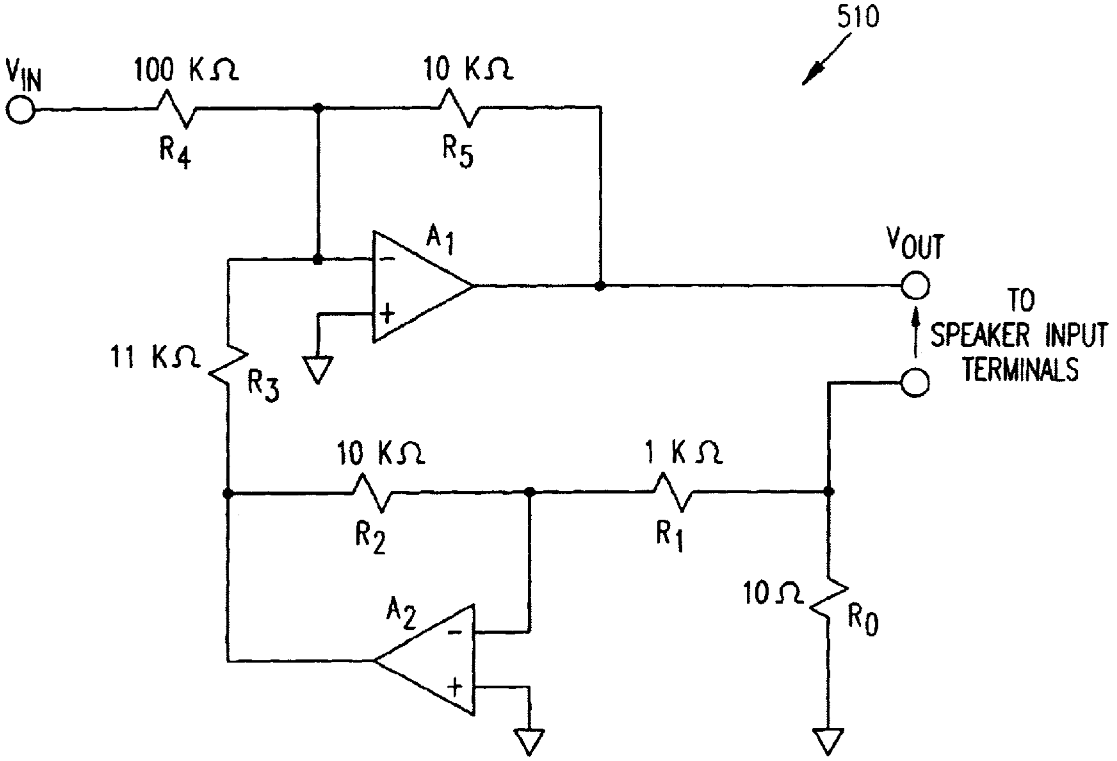
FIG. 7A is a schematic of a single-ended negative output resistance amplifier in accordance with an embodiment of the invention.

A single-ended embodiment of a negative output resistance amplifier 510 is illustrated in FIG. 7A. Exemplary resistance values are labeled next to corresponding resistors. The operational amplifiers, $A_1$ and $A_2$, may be AD8032 operational amplifiers made by Analog Devices, Inc. (Norwood, Mass., USA). However, the resistance values and operational amplifier type are a design choice, and may vary. Also, $R_0$ should be much less that $R_E$. The negative output resistance of the negative output resistance amplifier with reference to FIG. 7A is:

$$R_{OUT}=-(R_0*R_2*R_5)/(R_1*R_3),\ \text{wherein}\ R_0<<R_E \qquad \text{(Equation I)}$$

In the illustrated embodiment, where $R_0=10\Omega$, $R_1=1\ k\Omega$, $R_2=10\ k\Omega$, $R_3=11\ k\Omega$, $R_4=100\ k\Omega$ and $R_5=10\ k\Omega$, $R_{OUT}$ is about −91 ohms.

Figure 7B:
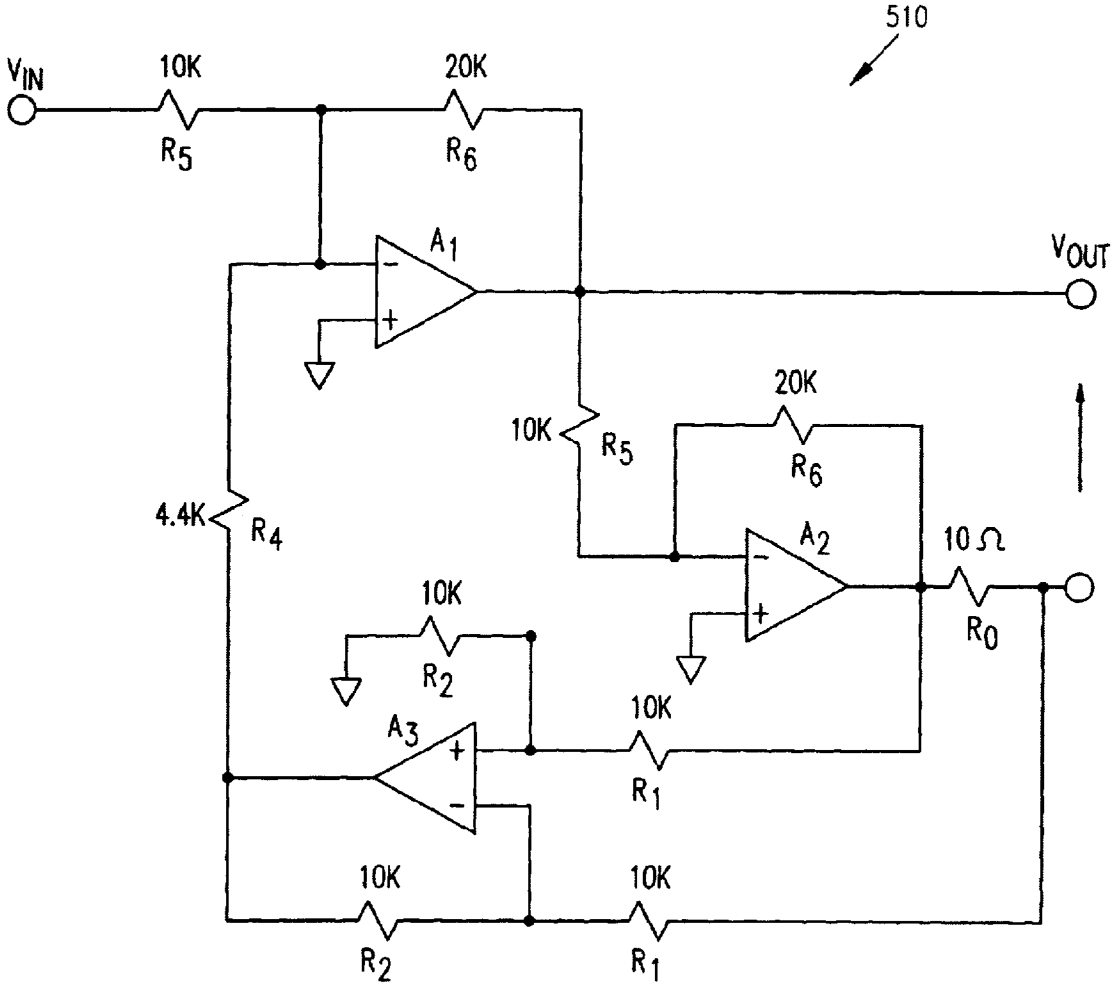
FIG. 7B is a schematic of a balanced negative output resistance amplifier in accordance with an embodiment of the invention.

A balanced embodiment of a negative output resistance amplifier 510 is illustrated in FIG. 7B. In comparison to the single-ended embodiment, the balanced embodiment has relatively higher output voltage for a given power supply voltage. Exemplary resistance values are labeled next to corresponding resistors. The operational amplifiers, $A_1$–$A_3$, may be AD8032 operational amplifiers made by Analog Devices, Inc. (Norwood, Mass., USA). However, again, the resistance values and operational amplifier type are a design choice, and may vary. The negative output resistance of the negative output resistance amplifier with reference to FIG. 7B is:

$$R_{OUT}=-(2*R_0*R_2*R_6)/(R_1*R_4),\ \text{wherein}\ R_0<<R_E. \qquad \text{(Equation II)}$$

In the illustrated embodiment, where $R_0=10\Omega$, $R_1=10\ k\Omega$, $R_2=10\ k\Omega$, $R_4=4.4\ k\Omega$, $R_5=10\ k\Omega$ and $R_6=20\ k\Omega$, $R_{OUT}$ is about −91 ohms.

By employing a negative output resistance amplifier, the Qs of the frequency responses of the speakers in the cups are diminished. For example, a cancelation of ninety percent of $R_E$ may reduce the Q by a factor of 10. Hence, changes in the resonances' amplitudes and frequencies, due to variations in ANR headset manufacturing and use, are diminished. As a result, a more stable ANR system can be developed that has relatively higher noise cancelation, for example, about 10 decibels higher than conventional ANR headsets. Further, a less complex equalization filter, having a correspondingly lower Q, proportional to the decrease of the Q of the speakers in the cups, can be implemented. Because the Q of the speakers' frequency response is reduced, the equalization filter can be implemented with relatively simpler filters. As a result, the number of parts used to implement the equalization filter is diminished. Further, the cost of the ANR system is, thus, diminished. Also, because the complexity of the equalization filter is reduced, part or all of the equalization filter may be incorporated into the ANR filter, further reducing part count and cost. Reduced part count also has the benefit of improving the reliability of the ANR system.

Temperature Compensation

The speaker's wire coil is formed from a conductor, such as copper. Thus, the wire coil resistance, $R_E$, varies with temperature according to a temperature coefficient of resistance (hereinafter "temperature coefficient") of the conductor. As a result, the frequency response, including the amplitude characteristics, of the speaker vary with temperature. For example, as temperature is varied from −20 degrees Celsius to 35 degrees Celsius, the amplitude of a speaker's frequency response, and hence output, varies by about 20 percent.

The temperature variations of the coil wire resistance, $R_E$, result in significantly diminished ANR headset stability. If the coil wire resistance, $R_E$, drops below $R_{OUT}$, the negative output resistance amplifier becomes unstable. As a result, the ANR headset would have reduced noise cancelation, and might possibly oscillate. Relatively low temperatures cause the open-loop gain, G(f), to increase. As a result, the closed-loop response, 1/(1−G(f)), could become unstable. Relatively high temperatures cause the open-loop gain to decrease. As a result, the ANR, provided by the closed-loop response, decreases. Note that generally the speaker temperature is not significantly higher than ambient temperature, because power dissipation in the wire coil is relatively small.

To diminish the likelihood that the ANR headset would become unstable as a result of temperature variations, the negative output resistance amplifier can be temperature compensated so that its output resistance, $R_{OUT}$, has a temperature coefficient substantially equivalent to the temperature coefficient of the wire coil resistance, $R_E$. This can be accomplished by providing the resistors specified in Equations I and II with any combination of temperature coefficients that result in a temperature coefficient substantially equal to the temperature coefficient of $R_E$. Some examples are illustrated below.

In one embodiment, utilizing the single-ended negative output resistance amplifier described above, temperature compensation can be achieved, for example, by implementing any one of the resistors identified in the numerator of Equation I, i.e., $R_0$, $R_2$ or $R_5$, with a resistor that has the same temperature coefficient as the wire coil resistance, $R_E$. For example, $R_0$ could be implemented with a copper wire wound resistor if the speaker's wire coil was made from copper. The other resistors, in Equation I, have resistances that are substantially temperature invariant. Because $R_0$ has the same temperature coefficient as the speaker's wire coil resistance, $R_E$, the temperature coefficient of $R_E$ and $-R_{OUT}$ will be approximately the same.

In another embodiment, utilizing the balanced negative output resistance amplifier described above, temperature compensation can be achieved, for example, by implementing any one of the resistors identified in the numerator of Equation II, i.e., $R_0$, $R_2$ or $R_6$, with a resistor that has the same temperature coefficient as the wire coil resistance, $R_E$. The other resistors, in Equation II, have resistances that are substantially temperature invariant.

In yet a further embodiment utilizing either the single-ended or balanced negative output resistance amplifiers, any two of the resistors identified respectively in the numerator of Equations I or II can be implemented with resistors such that the product of the two temperature coefficients is the same as the temperature coefficient of the wire coil resistance, $R_E$. The other resistors, in Equations I or II, have resistances that are substantially temperature invariant.

In yet a further embodiment utilizing either the single-ended or balanced negative output resistance amplifiers, all three resistors identified respectively in the numerator of Equations I or II can be implemented with resistors such that the product of the three temperature coefficients is the same as the temperature coefficient of the wire coil resistance, $R_E$. The resistors in the denominator, of Equations I or II, have resistances that are substantially temperature invariant.

In yet a further embodiment utilizing either the single-ended or balanced negative output resistance amplifiers, any one of the resistors respectively identified in the denominator of Equations I or II can be implemented with a resistor having a temperature coefficient that is the reciprocal of the temperature coefficient of the wire coil resistance, $R_E$. The other resistor, in Equations I or II, has a resistance that is substantially temperature invariant.

In yet a further embodiment utilizing either the single-ended or balanced negative output resistance amplifiers, the two resistors respectively identified in the denominator of Equation I or II can be implemented with resistors having a temperature coefficient such that the product of the two temperature coefficients are the reciprocal of the temperature coefficient of the wire coil resistance, $R_E$. Resistors with varying temperature coefficients are readily available as is known to persons skilled in the art.

CONCLUSION

An Automatic Noise Reduction system is disclosed wherein the Q of the frequency response is reduced using a negative output resistance to substantially eliminate the coil resistance of a speaker in a headset. The resulting system is less sensitive to variations in operating parameters, such as headset fit on a user and component variations. Temperature compensation of a negative output resistance amplifier is introduced to maintain stability over a wide range of operating temperatures. Temperature compensation includes substantially matching the temperature coefficient of the negative output resistance amplifier to the temperature coefficient of the speaker coil.

Although specific embodiments have been illustrated and described herein, it will be appreciated by those of ordinary skill in the art that any arrangement which is calculated to achieve the same purpose may be substituted for the specific embodiments shown. Many adaptations of the invention will be apparent to those of ordinary skill in the art. Accordingly, this application is intended to cover any adaptations or variations of the invention. It is manifestly intended that this invention be limited only by the following claims and equivalents thereof.

What is claimed is:

1. An automatic noise reduction headset, comprising:

at least one cup, wherein each cup includes a speaker having a wire coil;

at least one negative output resistance amplifier, having a negative output resistance, operatively coupled to the speaker in the one cup to enhace automatic noise reduction, wherein the one negative output resistance amplifier includes an input node and at first and second output nodes, first, second, and third amplifiers, and first, second, third, fourth, fifth, sixth, seventh, eighth, and ninth resistances, with the first and second output nodes coupled to the speaker, with the first resistance coupled between the input node and an input of the first amplifier, the second resistance coupled between the input of the first amplifier and an output of the first amplifier, the third resistance coupled between the output of the first amplifier and an input of the second amplifier, the fourth resistance coupled between the input of the second amplifier and an output of the second amplifier, the fifth resistance coupled between the output of the second amplifier and the second output node, the sixth resistance coupled between the output of the second amplifier and a first input of the third amplifier, the seventh resistance coupled between the second output node and a second input of the third amplifier, the eighth resistance coupled between the second input of the third amplifier and an output of the third amplifier, and the ninth resistor coupled between the output of the third amplifier and the input of the first amplifier;

a filter operatively coupled to each negative output resistance amplifier; and a microphone, in each cup, operatively coupled to each filter.

2. The automatic noise reduction headset of claim 1, wherein the filter further comprises an equalization filter to diminish the Q of a resonance in a frequency response of each speaker.

3. The automatic noise reduction headset of claim 1, wherein the negative output resistance is substantially equal in magnitude to a resistance of the wire coil.

4. The automatic noise reduction headset of claim 1, wherein a magnitude of the negative output resistance is approximately equal to 90% of a magnitude of a resistance of the wire coil.

5. The automatic noise reduction headset of claim 1, wherein each negative output resistance amplifier is a balanced negative output resistance amplifier.

6. The automatic noise reduction headset of claim 1, wherein each negative output resistance amplifier is further temperature compensated so that a temperature coefficient of the negative output resistance is approximately equivalent to a temperature coefficient of a resistance of the wire coil.

7. The automatic noise reduction headset of claim 6, wherein each negative output resistance amplifier is temperature compensated by implementing a resistor in the negative output resistance amplifier having resistance having a temperature coefficient that is approximately equivalent to a temperature coefficient of a resistance of the wire coil, wherein the negative output resistance is directly proportional to the resistance of the resistor and wherein remaining resistors in the negative output resistance amplifier have resistances which are substantially temperature invariant.

8. The automatic noise reduction handset of claim 1, wherein each negative output resistance amplifier is temperature compensated by implementing a resistor in the negative output resistance amplifier having resistance having a temperature coefficient that is approximately equivalent to an inverse of a temperature coefficient of a resistance of the wire coil, wherein the negative output resistance is inversely proportional to the resistance of the resistor and wherein remaining resistors in the negative output resistance amplifier have resistances which are substantially temperature invariant.

9. The automatic noise reduction headset of claim 1, wherein the first amplifier includes another input coupled to a supply voltage node, and wherein the second amplifier includes another input coupled to the supply voltage node.

10. The automatic noise reduction headset of claim 1, wherein each amplifier comprises an operational amplifier and the input of the first amplifier is an inverting input and the input of the second amplifier is an inverting input and the input of the third amplifier is a non-inverting input.

11. The automatic noise reduction headset of claim 1, wherein the one negative output resistance amplifier comprises means for compensating its output resistance for temperature variations.

* * * * *